June 5, 1956     L. J. COLLINS     2,749,070
FOOD MIXERS
Filed Dec. 21, 1953     2 Sheets-Sheet 2
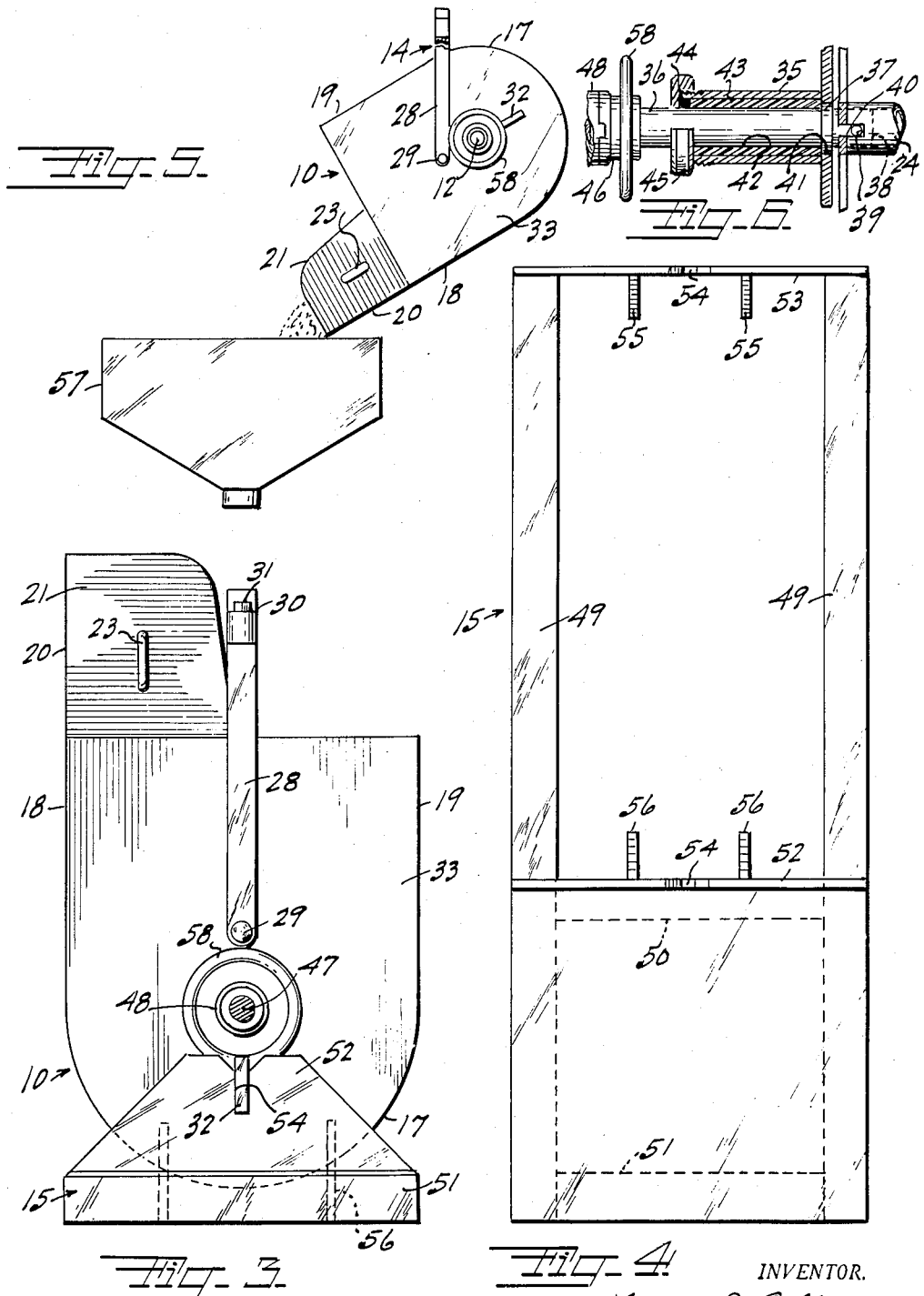

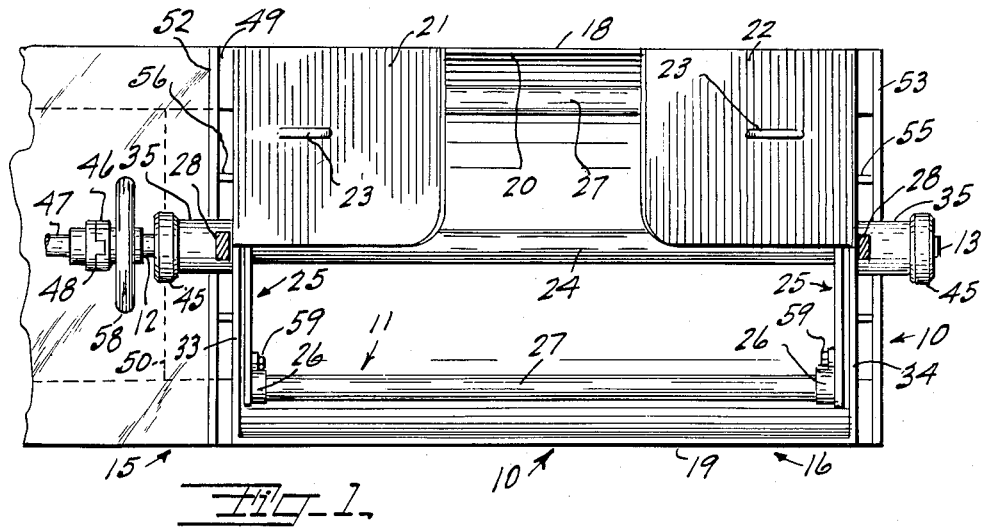

United States Patent Office 2,749,070
Patented June 5, 1956

2,749,070

FOOD MIXERS

Lowell J. Collins, Oakland, Calif.

Application December 21, 1953, Serial No. 399,210

3 Claims. (Cl. 248—146)

This invention relates to improvements in food mixers, for mixing various food products such as cottage cheese, salads, dressings, and the like, and resides principally in the mounting, coupling, and selective manual operating means, and provides a mounting which permits the mixer to be quickly and easily removed from the mounting and hoisted for discharge into a filler vat, and includes a quick releasable coupling means for the prime mover, manually operable means for facilitating discharge of the contents from the hoisted mixer, and centering means incorporated in the mounting means for centering the mixer and aligning same with the prime mover.

The objects and advantages of the invention are as follows:

First, to provide mounting means for a food mixer, which will axially align the mixer with its prime mover and maintain the mixer in an upright position during operation, and which will simultaneously center the mixer axially in the mounting means.

Second, to provide a mixer having an agitator and a releasable shaft therefor with means for manually rotating said shaft and agitator when the mixer is removed from the mounting means, for facilitating discharge of the contents of the mixer.

Third, to provide a mixer as outlined with its shafts and bushings sealed against external application of lubrication, for lubrication solely by the liquids contained in the foods being processed in the mixer.

Fourth, to provide mounting means as outlined which is of the utmost simplicity in construction and accurate in its operations.

In describing the invention reference will be had to the accompanying drawings, in which:

Fig. 1 is a top plan view of a food mixer and illustrating the invention.

Fig. 2 is a side elevation of Fig. 1.

Fig. 3 is an end elevation showing the drive end of the mixer and mounting means.

Fig. 4 is a top plan view of the mounting means.

Fig. 5 is a side elevation of the mixer shown discharging its contents into a filler vat, and indicating the purpose of the manually operable rotating means for the shaft for operating the agitator for facilitating discharge of the contents.

Fig. 6 is a longitudinal section through the quick removable shaft and bushing assembly.

The invention includes a mixer 10 having an agitator 11, a coupling shaft 12, a support shaft 13, a bail 14, and a base 15.

The mixer bowl 16 has a semi-cylindrical bottom 17, side walls 18 and 19, and a lip 20 formed as an upward extension of the side wall 18 and having convergent gathering wings 21 and 22, these wings being provided with handles 23 for manual tilting or inverting of the bowl.

The agitator 11 as shown consists of a tubular shaft 24, a spider 25 at each end and fixed to the shaft, and a bearing 26 fixed on each arm of the spider, and a tubular cross member 27 has its respective ends rotatable in the paired bearings on the spider arms, there being one cross member for each pair of bearings.

The bowl is provided with a bail 14 and consisting of drop members or side arms 28 which are pivoted to the bowl in spaced relation above its axis as indicated at 29 with the upper ends fixed in a cross-head 30 as indicated at 31. A supporting tongue 32 projects outwardly from each of the end walls 33 and 34 and is preferably located directly below the bearing sleeves 35 which are fixed to these end walls, and these tongues are non-circular in cross section, and as shown are rectangular and disposed in a vertical plane or perpendicular to the axis.

The bearings, bushings and shafts illustrated in longitudinal section in Fig. 6 are fully disclosed and claimed in my co-pending application, Serial Number 399,300 filed December 21, 1953, now Patent No. 2,723,110 issued November 8, 1955, for a sanitary bearing and shaft combination and consist of a shaft 36 which has an annular collar 37 formed in spaced relation to one end 38 and having a bayonet type coupling pin 39 fixed in the intervening portion to engage in the bayonet type slots 40 formed diametrically in the respective ends of the tubular agitator shaft 24, thus this end of the shaft for one end of the bowl provides both, driving and support means, while for the other end it provides the support, both shafts being alike except for the driving connection for the prime mover.

The annular collar 37 operates freely in a passage 41 provided in the end wall, and this passage is of lesser diameter than the bore 42 in the sleeve 35, and a bushing 43 has the shaft 36 rotatable therein and is slidable in the bearing sleeve 35, and its inner end is stopped by the annular portion of the wall, and cooperates with the annular collar 37 as a thrust bearing.

The sleeve 35 is slightly longer than the bushing 43 to provide a housing for the resilient sealing ring 44. The gland 45 screws onto the end of the sleeve 35, compressing the resilient sealing ring to provide an effective seal and fix the shaft against outward axial movement.

Slidably and non-rotatably mounted on the outer end of the shaft 36 is a coupling member 46 which has an integral handwheel for manual rotation of the shaft and consequently the agitator when the mixer is removed from the power driving means which connects with the shaft 36 through shaft 47 and cooperative coupling member 48.

The base is designed to support the mixer, and space and center the bowl relative to the driving means, and provide, in conjunction with the quick-release coupling, an easy, convenient and quick arrangement for transferring the bowl respectively for removal and discharge, and for operation, while the quick removable shafts and bushings are provided for thorough and rapid cleaning and sterilizing of the individual parts of the mixer.

The base consists of a bowl supporting portion with an extension at one end for support of the driving means, and includes suitable stringers 49 which may be of any desired and suitable structural shape, cross members 50 and 51 for the extension for the support for the driving means, and two spaced tongue support members 52 and 53 at the respective ends of the bowl support portion, and each of which tongue support members are provided with a vertical central slot 54 to receive the tongues 32 on the bowl, and having a depth in which the tongue rests on the bottom when the shaft 36 is in axial alignment with the drive shaft 47. Acute angle wedges 55 and 56 are fixed to the lower portions of these tongue support members 52 and 53 to cause the bowl to center and space properly for the drive shaft, whereby the bowl may be set down between these tongue support members and the wedges will cause the bowl to be centered and spaced.

Considering a complete cycle of operations, with the mixer in position and connected to the driving means. The rollers 27 do not tend to cut and mash the constituents of the food mixture yet provide very thorough mixing. When mixing is completed, a suitable lifting device is connected to the bail. The coupling 46—48 is disconnected by manually pulling back on the handwheel. The mixer is lifted and carried to the filling vat indicated at 57 and elevated suitably, after which the handles 23 are manually grasped and the bowl partially inverted as indicated in Fig. 5. The agitator is then manually operated by means of the handwheel 58, causing the cross arms 27 to advance the product to the lip 20 and thus facilitate discharge of the contents.

When the contents have been discharged, the mixer is removed to any suitable place for cleaning and sterilization and may be supported in the base Fig. 4 or in an extra base without prime mover platform.

The coupling member and handwheel 46—58 are pulled off the drive shaft, the glands 45 are unscrewed from the bearing sleeves 35 at the respective ends of the bowl, after which the shafts with bushings, sealing rings and glands are pulled out of the sleeves as units, and then can be completely disassembled by merely slipping the latter mentioned members off the shaft.

Withdrawing the shafts releases the agitator which can be lifted out of the bowl, whereby all parts can be individually cleaned and sterilized. Following sterilization the mixer is easily and quickly re-assembled, then merely carried over to the base and set in position, the base with its vertical slot 54 cooperative with the support tongues 32, and the wedges 55 and 56 automatically axially aligning and spacing the mixer with reference to the driving means or drive shaft 47. The coupling member 46 is then brought into engagement with the cooperative coupling member 48 on the drive shaft through urgence applied through the handwheel 58, placing the mixer in condition and ready for another processing operation.

Since the bearing cups 26 are removably secured to the spiders as indicated at 59, even these bearings and agitator cross members 27 can be individually sterilized and cleaned. And, since the bushings for all bearings are formed of a polyamide resin which requires no oil or grease for lubrication but is lubricated by any of the fluids existent in food mixtures, and since no provision is made for exterior lubrication of the bearings, there can be no contamination of the food product.

I claim:

1. Self centering supporting means for a food mixer having a bowl having end walls comprising, a tongue projecting from each end wall and rectangular in form and vertically positioned, and a base having spaced brackets having each a vertical slot to receive the tongues for support of the mixer against tipping or transverse movement, and having wedges projecting inwardly from said brackets for axially centering said bowl between said brackets for positioning said bowl relative to driving means for the mixer.

2. Centering and supporting means for a food mixer having a bowl having end walls comprising, a base having spaced transverse vertical supports each having a vertical slot formed centrally thereof in the top edge, a tongue projecting from and fixed to each of said end walls and slidably fitting in said vertical slots for supporting said bowl in an upright position.

3. A structure as defined in claim 2; inverted wedges fixed to the inside surfaces of said vertical supports and substantially at right angles thereto and cooperative with the bottom edges of the bowl for axially centering said bowl for positioning and alignment in driving arrangement for the food mixer.

References Cited in the file of this patent

UNITED STATES PATENTS

| 1,182,353 | Cotabish et al. | May 9, 1916 |
| 1,457,622 | Eliopulos | June 5, 1923 |
| 1,584,562 | Kulenkampff | May 11, 1926 |
| 1,909,324 | Wendler | May 16, 1933 |
| 2,167,316 | Spangler et al. | July 25, 1939 |
| 2,576,575 | Collins | Nov. 27, 1951 |
| 2,644,652 | Hannay | July 7, 1953 |

FOREIGN PATENTS

| 636,878 | Germany | Oct. 16, 1936 |